May 31, 1932. N. W. TRAVISS 1,860,697
RADIATOR SCREEN STRUCTURE
Filed May 23, 1930
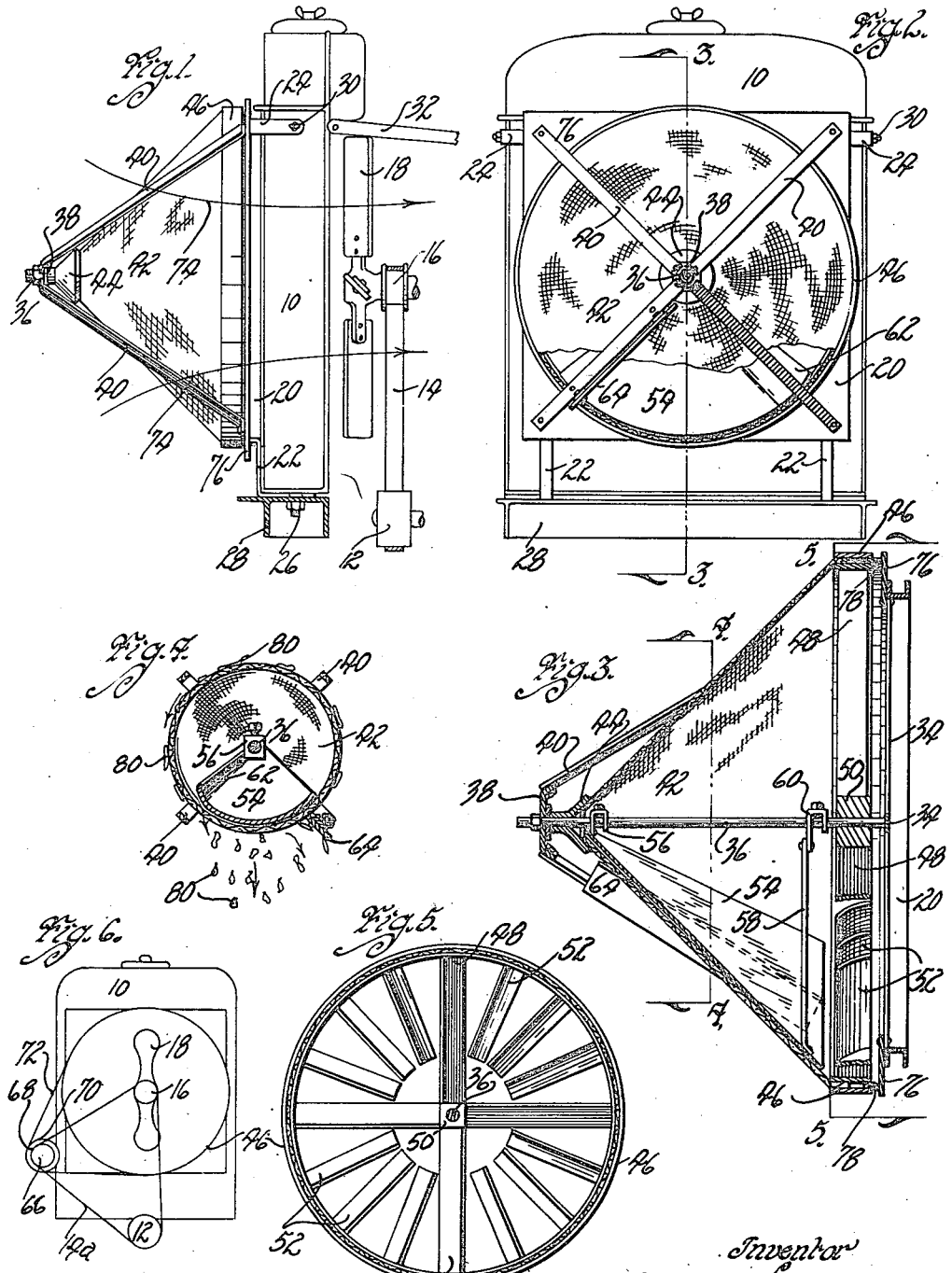

Patented May 31, 1932

1,860,697

UNITED STATES PATENT OFFICE

NORMAN W. TRAVISS, OF DES MOINES, IOWA

RADIATOR SCREEN STRUCTURE

Application filed May 23, 1930. Serial No. 455,076.

The object of my invention is to provide a radiator screen structure which is simple, durable and comparatively inexpensive to manufacture.

A further object of my invention is to provide a self-cleaning screen for the radiator used on combine harvesters, tractors used for pulling harvesters and the like.

More particularly it is my object to provide a screen structure adapted to be applied to a radiator, or other draft producing device, for screening foreign matter from entering such device. The screen structure includes a screen and a draft shield, one being rotatable relative to the other, whereby foreign material adhering to the screen because of the draft may be dropped from the screen when passing in front of the draft shield where there is no tendency for the draft to retain the material against the screen.

Still a further object is to bend a portion of the draft shield away from the screen so as to form a wedge portion into which air traveling with the screen during its rotation will be driven and compressed for forcing foreign matter away from the screen.

More particularly it is my object to provide a shaft supported in a forwardly extending position on a radiator with a cone shaped screen rotatable on the shaft and a draft shield fixed on the shaft and located adjacent the screen and arranged at the bottom of the screen so that when any portion of the screen passes by the draft shield any foreign matter on such portion will be shielded from the draft and will drop off the screen by gravity.

Still a further object is to provide a means for rotating the screen which may be accomplished by fan blades on the screen on which the draft operates to rotate the screen, or some power means may be operatively connected with the screen for rotating it.

Another object is to provide a deflector blade adjacent the trailing edge of the draft shield to aid in the disengagement of foreign material from the screen.

With these and other objects in view my invention consists in the construction, arrangement and combination of the various parts of my device, whereby the objects contemplated are attained, as hereinafter more fully set forth, pointed out in my claims, and illustrated in the accompanying drawings, in which:

Figure 1 is a side elevation of a radiator showing my improved type of screen structure applied thereto.

Figure 2 is a front elevation of the same, a part of the screen being broken away.

Figure 3 is a sectional view on the line 3—3 of Figure 2.

Figure 4 is a sectional view on the line 4—4 of Figure 3, illustrating the screen and the draft shield in their operative relation to each other.

Figure 5 is a sectional view on the line 5—5 of Figure 3 illustrating the fan blades in the screen; and Figure 6 is a diagrammatic view of a radiator and screen therefor showing a means for mechanically rotating the screen from the engine of a tractor or the like.

Difficulty has been experienced in keeping radiators of tractors or the like from clogging up with foreign material, especially is this true in the combine harvesters now being manufactured. In the operation of combine harvesters there is considerable loose straw and chaff flying around in the air and this is drawn into the radiator cores of the motors which operate the mechanism of the harvesters, and also in the radiators of the tractors which pull the harvester.

Similar difficulty has been experienced with the tractors which pull corn pickers and other types of corn harvesters. It has been my prime object to develop an effective self cleaning screen to screen such foreign matter from radiators and the like, and thus eliminate the tendency toward clogging the radiators, the necessary stopping of the machinery to clean the radiators and the boiling away of the water in the radiator.

In the accompanying drawings I have used the reference numeral 10 to indicate the radiator of a tractor or other type of motor.

A drive pulley 12 is operatably connected with the motor of the tractor behind the radiator 10 and is belted by a belt 14 to a fan pulley 16. The fan pulley 16 is connected with a cooling fan 18 which draws air through the radiator 10. The foregoing refers to cooling radiators for an internal combustion engine of the ordinary present day construction.

My invention has to do with a screen for such a radiator and includes a substantially rectangular frame 20 which may be secured to the radiator 10 in any suitable manner. I have illustrated brackets 22 and 24 coacting with the channel shaped periphery of the frame 20 and secured to the radiator 10. The brackets 22, for instance, are bolted to the stud bolts 26 which retain the radiator in position on the frame member 28 of the tractor, while the brackets 24 are bolted to the stud bolts 30 which are ordinarily provided for the forward ends of braces 32 for the radiator. Different types of brackets of course may be used for different types of radiators.

A plurality of spokes 34 are secured to the frame 20 as best shown in Figure 3 of the drawings and the inner end of a shaft 36 is supported by these spokes. The outer end of the shaft 36 is supported by a fitting 38 and angularly arranged braces 40 which have their rear ends fastened to the frame 20 and their forward ends fastened to the fitting 38. Thus the shaft 36 is stationarily and rigidly supported relative to the frame 20.

Rotatably mounted on the shaft 36 is a cone shaped screen 42. The forward end of the screen 42 is secured to a bearing member 44 rotatable on the shaft 36, while the outer edge of the screen is secured to a rim 46 preferably formed of two bands of sheet metal, one within the other and with the edge of the screen confined between the two bands.

Spokes 48 extend from the rim 46 to a bearing member 50 which is rotatable on the shaft 36. Thus the entire assembly of screen 42 and the members 44, 46 and 48 are rotatable on the shaft. The spokes 48 are shaped like the blades of a fan so that the draft created by the cooling fan 18 of the radiator 10 will cause rotation of the screen assembly on the shaft 36. Additional blades 52 may be provided extending inward from the rim 46 if found necessary.

Stationarily mounted with respect to the shaft 36 is a segmental cone shaped draft shield 54. It is supported by a bracket 56 at its forward end and a plurality of spokes 58 and a bracket 60 at its rear end. The brackets 56 and 60 may be secured to the shaft 36 by suitable set screws.

The draft shield 54 is located below the shaft 36 and is positioned adjacent the lower part of the screen 42 and its leading edge, as indicated at 62, is turned in slightly (see Figure 4).

On the outside of the screen 42 I provide a deflector blade 64 mounted on one of the supporting braces 40 and arranged quite close to the screen 42 and adjacent the trailing edge of the draft shield 54.

If found desirable, instead of depending on the draft created by the cooling fan 18 to act upon the spokes 48 and the blades 52 to rotate the screen 42, a mechanical means may be utilized for driving the screen, such as shown in Figure 6. In this figure, a shaft 66 is rotatably supported by brackets at the side of the radiator 10 and is provided with a pair of pulleys 68 and 70. The pulley 68 is in line with the drive pulley 12 and fan pulley 16 and the fan belt 14a extends over all three for driving both the fan 18 and the pulley 68 from the pulley 12. A belt 72 extends around the pulley 70, and the screen rim 46 which are in line with each other, for driving it.

In this type of device the fan blades 52 can be retained for aiding the draft caused by the cooling fan 18, or may be entirely dispensed with and the spokes 48 may be plain instead of fan shaped.

*Practical operation*

In the operation of my self cleaning screen structure, rotation of the cooling fan 18 causes a draft in the direction of the arrows 74 through the radiator 10. The air must come through the screen 42 and is shielded from entering between the rim 46 and a flange 76 on the frame 20 by means of felt or the like 78 placed in the rim 46 (see Figure 3). Any foreign matter will be screened from entering the radiator by the screen 42 and as the screen rotates, this foreign matter, indicated at 80 in Figure 4, will drop from the screen when shielded from the draft by the shield 54.

The leading edge 62 of the draft shield 54 provides a wedge shaped space into which the air which has a tendency to follow the interior surface of the screen 42 will be compressed and forced through the screen, thus aiding in clearing the screen of the foreign matter 80.

If there is a tendency for any of the foreign matter to still remain on the screen, the deflector blade 64 will help in cleaning the screen.

My self cleaning screen can be applied to any radiator or other type of draft producing device for the purpose of screening foreign material from the air entering into the device.

A screen of the character herein disclosed can be flat as well as cone-shaped, and it will work with the shield rotating instead of the screen.

It should be noted also that the rotation of the screen results in a centrifugal force which tends to assist in the removal of foreign matter therefrom; and that this force may be relied upon either to assist or to accomplish the removal of such substance, without the use of other agencies.

Various changes may be made in the construction and arrangement of the parts of my device without departing from the real spirit and purpose of my invention, and it is my intention to cover by my claims, any modified forms of structure or use of mechanical equivalents.

I claim as my invention:—

1. A device of the class described comprising a screen member adapted to be located in a column of traveling air to screen foreign matter from such air, a draft shield member comprising a plate closely adjacent said screen member throughout the entire surface of the plate and following the contour of said screen member for a substantial radial portion of the surface thereof and means to rotate one member relative to the other one.

2. A device of the class described comprising a cone shaped screen member adapted to be located in a column of traveling air to screen foreign matter from such air, a segmental cone shaped draft shield member closely adjacent said screen member throughout the entire surface of the draft shield member and means to rotate one member relative to the other one.

3. A device of the class described comprising a rotary cone shaped screen member adapted to be located in a column of traveling air to screen foreign matter from such air, a draft shield member adjacent said screen member and means to rotate said screen member, said draft shield being located adjacent and above the lowest portion of the screen member.

4. A device of the class described comprising a screen member adapted to be located in a column of traveling air to screen foreign matter from such air, a draft shield member adjacent said screen member and means to rotate one member relative to the other one, said draft shield member having a leading portion bent away from the screen member.

5. A device of the class described comprising a screen member adapted to be located in a column of traveling air to screen foreign matter from such air, a draft shield member adjacent said screen member, means to rotate one member relative to the other one, and a deflector member adjacent the trailing edge of the shield member and on the opposite side of the screen member from the shield member.

6. For use with a draft producing device, a rotary, cone shaped screen, a stationary, segmental, cone shaped draft shield thereadjacent and means for rotating said screen, said means being operatively connected with the draft producing device.

7. For use with a radiator and a cooling fan, a screen member for screening foreign matter from entering said radiator, means for rotatably mounting the screen on the radiator, a draft shield member adjacent the outgoing side of the screen and means for rotating said screen member.

8. For use with a radiator and a cooling fan, a screen member for screening foreign matter from entering said radiator, means for rotatably mounting the screen on the radiator, a draft shield member adjacent the outgoing side of the screen and means for rotating said screen member, said means being operatively connected with said fan.

9. For use with a radiator and a cooling fan, a screen member for screening foreign matter from entering said radiator, means for rotatably mounting the screen on the radiator, a draft shield member adjacent the outgoing side of the screen and means for rotating said screen member, said screen member being cone shaped and said draft shield member being segmental cone shaped.

10. For use with a radiator and a cooling fan, means for screening foreign matter from entering the radiator comprising a shaft supported on and projecting forwardly from the radiator, a forwardly pointed cone shaped screen rotatable on said shaft, a draft shield depending from the shaft and arranged adjacent the upper surface of the lower part of the screen.

11. For use with a radiator and a cooling fan, means for screening foreign matter from entering the radiator comprising a shaft supported on and projecting forwardly from the radiator, a forwardly pointed cone shaped screen rotatable on said shaft, a draft shield depending from the shaft and arranged adjacent the upper surface of the lower part of the screen, the leading edge of said shield being bent away from the screen.

12. For use with a radiator and a cooling fan, means for screening foreign matter from entering the radiator comprising a shaft supported on and projecting forwardly from the radiator, a forwardly pointed cone shaped screen rotatable on said shaft, a draft shield depending from the shaft and arranged adjacent the upper surface of the lower part of the screen, the leading edge of said shield being bent away from the screen, and a deflector member adjacent the trailing edge of the shield and located adjacent and below the screen.

Signed at Des Moines, in the county of Polk, State of Iowa, this 17th day of May, 1930.

NORMAN W. TRAVISS.